Aug. 8, 1933.   J. B. ST. MAUR   1,921,173
AUTOMATIC EJECTING MECHANISM
Filed April 17, 1931   2 Sheets-Sheet 1

INVENTOR
John B. St.Maur,
BY
ATTORNEY

Aug. 8, 1933.  J. B. ST. MAUR  1,921,173
AUTOMATIC EJECTING MECHANISM
Filed April 17, 1931   2 Sheets-Sheet 2

INVENTOR
John B. St. Maur
BY
his ATTORNEY

Patented Aug. 8, 1933

1,921,173

UNITED STATES PATENT OFFICE 1,921,173

AUTOMATIC EJECTING MECHANISM

John B. St. Maur, Rochester, N. Y., assignor of one-fourth to Fred M. Zoller, Rochester, N. Y.

Application April 17, 1931. Serial No. 530,785

6 Claims. (Cl. 161—16)

My present invention relates to mechanical movements and more particularly to timing mechanisms, in which the power of an actuating device is stored and then restrained for a desired period before exercising its energy upon an element to be operated upon, and it has for its object to provide a simple, compact and serviceable mechanical structure of this kind comprising few parts and yet dependable in its performance.

To these and other ends, the invention resides in certain improvements and combinations of parts, all as will be hereinafter more fully described, the novel features being pointed out in the claims at the end of this specification.

In the drawings.

Similar reference numerals throughout its several views indicate the same parts.

Figure 2:
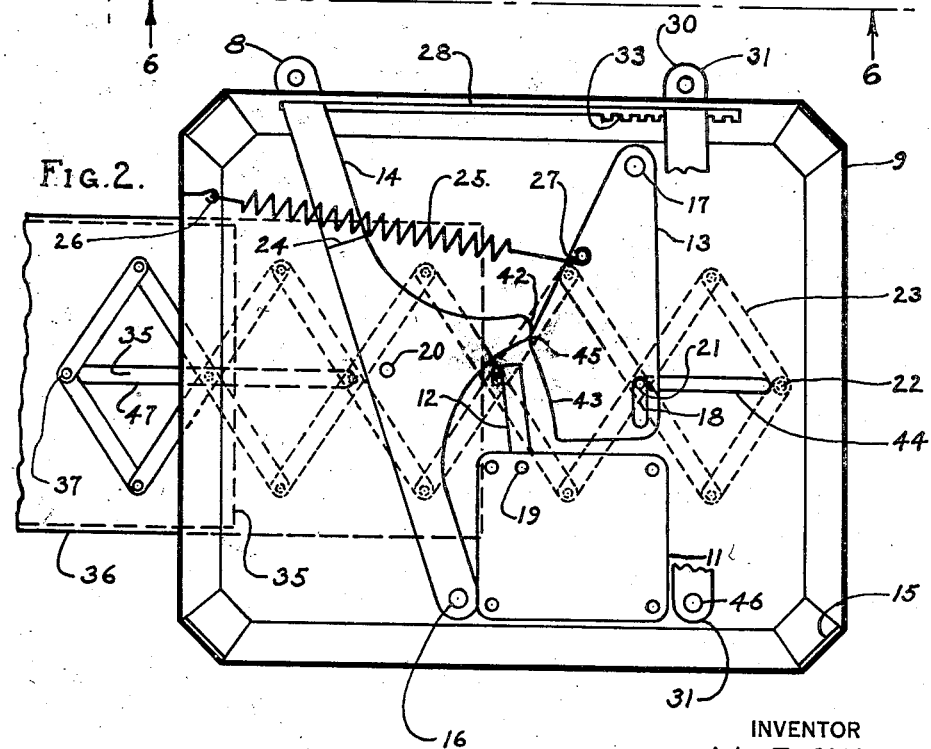
Fig. 2 is a bottom plan view, showing the actuating mechanism at the close of its functioning movement.
Figure 3:
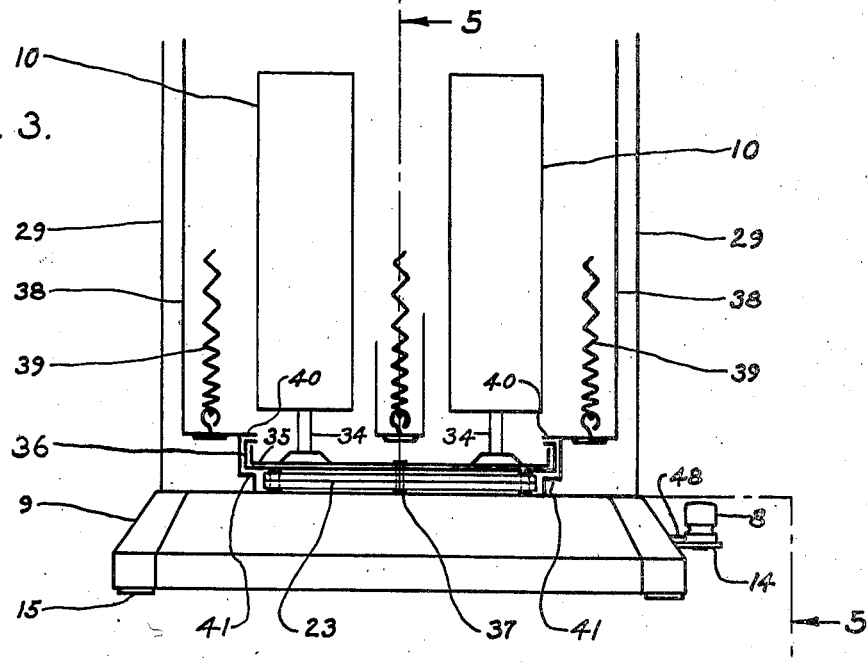
Fig. 3 is an end view of the toaster viewed from the left of Fig. 1.

In the present embodiment of the invention, I have illustrated it applied to an electric toaster for the purpose of projecting or removing the toast after it has been exposed to the heating element for the proper period of time, and referring more particularly to the drawings, 9 indicates the toaster base supported on pads 15 at the corners and carrying a superstructure embodying double casing walls 29 and 38 enclosing the usual or any preferred type of heating elements 39. Interspersed with the latter are a plurality of toast holders 10 supported by stems 34 on an extension slide 35. This extension slide 35 is in superposed relationship to and is guided by the inturned edges of a bed plate 36, which itself slides in guides 40—41 on the superstructure or casing. The two operate in the manner of the extension bed of a camera, that is, as shown in Fig. 2, the bed 36 may be projected part way from the casing and then the extension plate 35 carrying the toast holders can be further projected on it entirely outside of the casing. This movement is effected by an actuating pin 37 secured to plate 35 and extending through a slot 47 in bed plate 36. Upon the outward movement of this pin, plate 35 is extended first and then plate 36 is picked up and extended as pin 37 reaches the end of slot 47, as clearly shown in Fig. 2.

Figure 4:
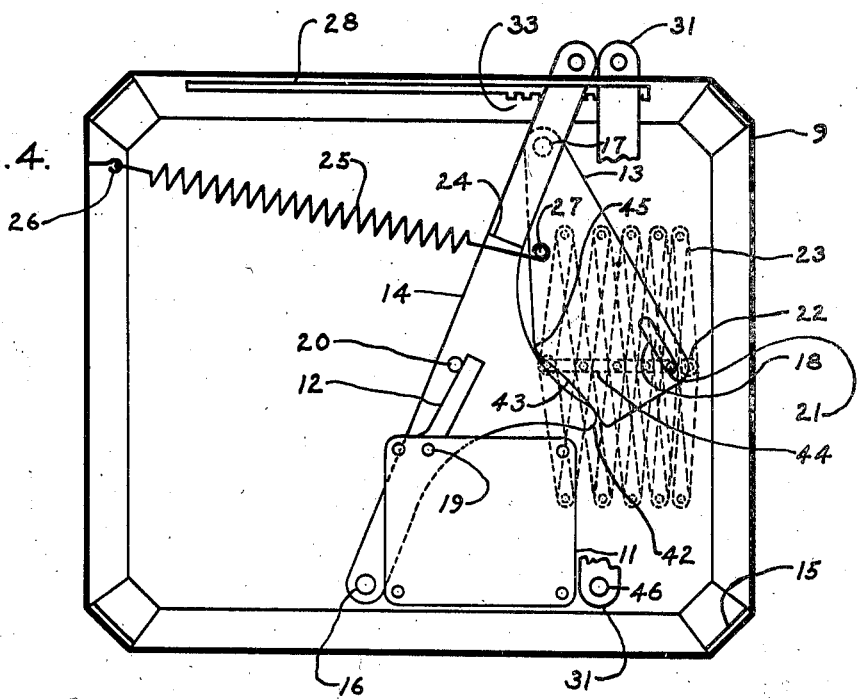
Fig. 4 is a bottom plan view similar to Fig. 2, but showing the actuating mechanism set at the commencement of its functioning movement.

Pin 37 is the end pivot of a lazytongs 23, the opposite and corresponding end pivot of which is secured to the top platform of the base 9 beneath the extension slides. Pivoted at 17 on the underside of the said platform is an actuator plate 13 provided with a slot 18, in which runs a pivot pin 21 of the lazytongs, which pin is also guided in a slot 44 in the platform. Through this construction, it will be seen that as the actuator 13 is swung to the right, as in Fig. 4, the lazytongs will be contracted and the toast supporting slides 35 and 36 drawn in to place the toast holders in operative position, while swinging the actuator to the left, as in Fig. 2, extends the lazytongs projecting the toast holders to the exterior.

The tendency of the actuator 13 is to assume the latter position and perform the last mentioned functions through the influence of a spring 25 connected to it at 27 and to a fixed point 26 on the base 9. This is the normal position of Fig. 2. When it is desired to operate the toaster, the actuator 13 is swung from the position of Fig. 2 to that of Fig. 4 by an operating lever 14 pivoted at 16 and extending through a slot 28 in the base 9 to terminate in an operating knob 8. A point 42 on this lever dwells upon a point 45 on the actuator 13 long enough to set the actuator, that is, to move the pin 21 from one end to the other of slot 44 and contract the lazytongs, but lever 14 then embarks upon a further idle movement, so far as the actuator is concerned, as point 42 of said lever traverses a surface 43 on the actuator plate that is concentric with pivot 16 of the operating lever. While riding this surface, the operating lever 14 holds the actuator plate 13 against return movement and holds spring 25 under tension.

As operating lever 14, in setting the device, is moved to the right in the figures, a pin 20 thereon engages the setting arm 12 pivoted at 19 of a familiar form of timing device, indicated generally at 11, but the details of which are not shown. It is sufficient to say that it may consist of a clock spring, gearing and an escapement, so that when arm 12 is moved to the right, as in Fig. 4, it winds the spring and the latter then has a tendency to move arm 12 slowly to the left to the normal position of Fig. 2. As it does so, it correspondingly slowly returns operating lever 14.

During the initial part of this returning movement, point 42 retraces its path on the concentric holding surface 43 of actuator 13 preventing movement thereof, but as soon as point 42 passes point 45 on the actuator, the latter is released and its spring 25 instantly projects the lazytongs and also returns operating lever 14 to normal position.

Figure 1:
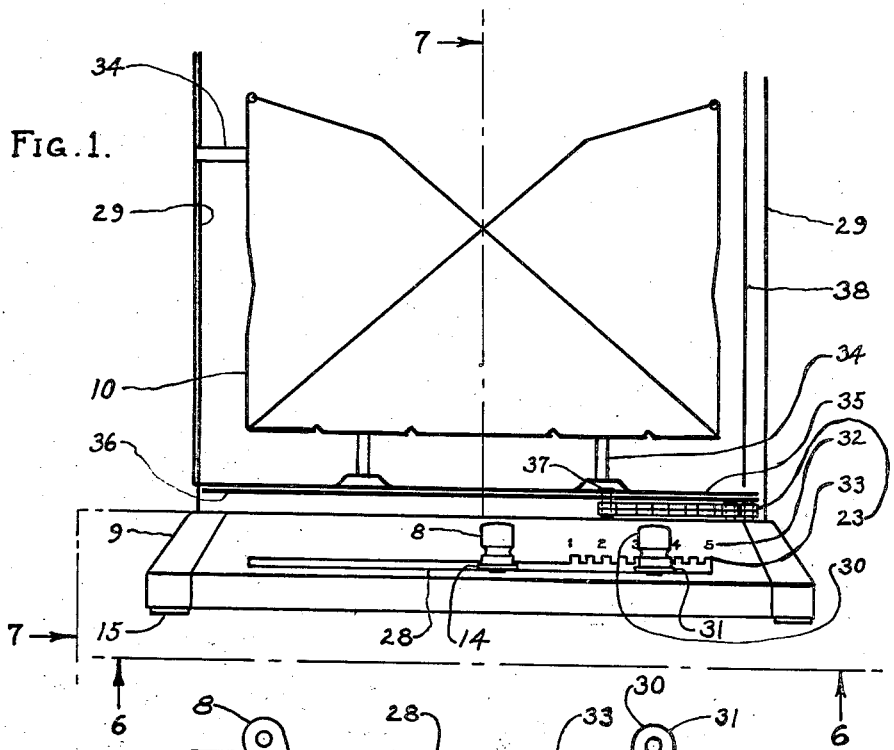
Fig. 1 is a side elevation of a bread toaster provided with a timing device constructed in accordance with and illustrating one embodiment of my invention, one of the heating elements of the toaster being conventionally shown with the upper portion broken away.

The toasting period may be controlled by varying the setting movement of operating lever 14 and hence regulating the extent to which lever 12 of the timing device is moved and its spring energized. I accomplish this by providing a variable stop or abutment for the lever 14. This consists, in the present showing, of a lever 31 pivoted at 46 and also extending through slot 28 to terminate in a knob 30, said lever being shown broken away in the plan views. The adjacent portion of slot 28 is serrated or provided with a plurality of stop teeth with which a latch point 48 on lever 31 selectively engages. The spring of the lever is sufficient to maintain the engagement and lever 31 is, of course, in the path of lever 14. As shown at 32 in Fig. 1, suitable characters may be stamped on the base to form a scale adjacent to the stop piece 33 indicating different periods of time to assist the operator in the settings.

A device constructed in accordance with my invention is simple and convenient but sure in its operation and, as first stated may be applied to mechanism other than a toaster, where it is desired to maintain a support in operative position for a definite period and then automatically and quickly move it to an inoperative position.

I claim as my invention:

1. In a mechanical movement, the combination with an article support having operative and inoperative positions, a supporting slide for the support and a guide for the slide, of an actuator for the slide, a detent lever for moving the actuator to set position and having a receding idle movement while in detaining contact therewith, and a time controlled device for imparting gradual releasing movement to the detent lever.

2. In a mechanical movement, the combination with an article support having operative and inoperative positions, a supporting slide for the support and a guide for the slide, of an actuator for the slide, a detent lever for moving the actuator to set position and having a receding idle movement while in detaining contact therewith, a time controlled device for imparting gradual releasing movement to the detent lever, and a lazytongs connecting the actuator with the slide.

3. In a mechanical movement, the combination with a base, a horizontal extension slide on top of the base, and an article support on the slide having operative and inoperative positions, of an actuator for the slide on the underside of the base, a detent lever also on the underside of the base cooperating with the actuator to move it to set position and having a receding idle movement while in detaining contact therewith, and a time controlled device on the underside of the base for imparting gradual releasing movement to the detent lever.

4. In a mechanical movement, the combination with a base having a slot therein, an extension slide on top of the base, an article support on the slide having operative and inoperative positions, and a lazytongs on top of the base having a pivot extending through the slot and also connected to the slide, of an actuator for the slide on the underside of the base engaging the said pivot, a setting and detent lever also on the underside of the base cooperating with the actuator and having an idle movement while in detaining contact therewith, and a time controlled device on the underside of the base for imparting releasing movement to the setting lever.

5. In a mechanical movement, the combination with a base having a slot therein, a pair of superposed extension slides on top of the base, the lower one of which is provided with a slot, an article support on the upper slide having operative and inoperative positions, and a lazytongs on top of the base having a pivot extending through the slot in the latter and that in the under slide and secured to the upper slide, of an actuator for the slide on the underside of the base engaging the said pivot, a setting and detent lever also on the underside of the base cooperating with the actuator and having an idle movement while in detaining contact therewith, and a time controlled device on the underside of the base for imparting releasing movement to the setting lever.

6. In a mechanical movement, the combination with an article support having operative and inoperative positions, a supporting slide therefor, and a guide for the latter, of a pivoted actuator for the slide, a setting and detent lever for the actuator, the latter having a surface concentric with the pivot of said setting lever on which the latter rides while detaining the actuator, and a time controlled device for imparting releasing movement to the setting lever.

JOHN B. ST. MAUR.